United States Patent
Nilsson

(10) Patent No.: US 8,477,064 B2
(45) Date of Patent: Jul. 2, 2013

(54) LOOP-POWERED FIELD DEVICE

(75) Inventor: Valter Nilsson, Hovås (SE)

(73) Assignee: Rosemount Tank Radar AB, Gothenburg (SE)

( * ) Notice: Subject to any disclaimer, the term of this patent is extended or adjusted under 35 U.S.C. 154(b) by 280 days.

(21) Appl. No.: 12/976,125

(22) Filed: Dec. 22, 2010

(65) Prior Publication Data

US 2012/0162003 A1 Jun. 28, 2012

(51) Int. Cl.
*G01S 13/08* (2006.01)

(52) U.S. Cl.
USPC .......................... 342/124; 342/104; 342/118

(58) Field of Classification Search
USPC ................................................. 342/104–158
See application file for complete search history.

(56) References Cited

U.S. PATENT DOCUMENTS

| | | | |
|---|---|---|---|
| 4,849,754 A | 7/1989 | Maltby et al. | 340/870.38 |
| 6,680,690 B1 | 1/2004 | Nilsson et al. | 342/124 |
| 7,596,006 B1 * | 9/2009 | Granat | 363/39 |
| 2006/0273949 A1 * | 12/2006 | Nilsson | 342/124 |
| 2009/0117873 A1 | 5/2009 | Ferreira | 455/344 |
| 2010/0123614 A1 * | 5/2010 | Nilsson | 342/124 |

FOREIGN PATENT DOCUMENTS

WO WO 02/44748 A2 6/2002

OTHER PUBLICATIONS

Search Report from PCT Application No. PCT/EP2011/065329, dated Oct. 31, 2011, 4 pgs.
Written Opinion from PCT Application No. PCT/EP2011/065329, dated Oct. 31, 2011, 9 pgs.

* cited by examiner

*Primary Examiner* — Timothy A Brainard
(74) *Attorney, Agent, or Firm* — Westman, Champlin & Kelly, P.A.

(57) ABSTRACT

A loop-powered field device for determining a process variable and providing a measurement signal indicative of the process variable to a remote location via a two-wire current loop, the loop-powered field device comprising: a measurement device for determining the process variable; and loop interface circuitry for providing the measurement signal to the two-wire current loop and for providing power from the two-wire current loop to the measurement device. The loop interface circuitry comprises: current control circuitry connected to the two-wire current loop and the measurement device, the current control circuitry being controllable by the measurement device to provide the measurement signal to the two-wire current loop; a first converter having inputs connected to the two-wire current loop in series with the current control circuitry, and an output for providing power to the measurement device; and voltage regulation circuitry for regulating a voltage across the current control circuitry towards a desired voltage, by controlling an input voltage across the inputs of the first converter.

15 Claims, 2 Drawing Sheets

LOOP-POWERED FIELD DEVICE

FIELD OF THE INVENTION

The present invention relates to a loop-powered field device for determining a process variable and providing a measurement signal indicative of the process variable to a remote location via a two-wire current loop. The present invention further relates to a loop interface circuit and to a method of providing power from a two-wire current loop to a loop-powered field device.

BACKGROUND OF THE INVENTION

Field devices, such as radar level gauges are suitably used for measuring the level of products such as process fluids, granular compounds and other materials. An example of such a radar level gauge can include a microwave unit for transmitting microwaves towards the surface and receiving microwaves reflected by the surface, processing circuitry arranged to communicate with the microwave unit and to determine the level based on a relation between transmitted and received microwaves, an interface for connecting said processing circuitry externally of the radar level gauge, and a power management circuitry providing the microwave unit and the processing circuitry with operating power.

In order to ensure a satisfactory signal level of the received echo, the emitted microwaves must have a sufficient power level. The processing of received signals also requires significant power, and in some cases the clock frequency of the processor is increased during the processing in order to enable high speed calculations. In combination, this results in an increased demand of power during certain parts of the measuring cycle. The power requirements are especially high for Frequency Modulated Continuous Wave (FMCW) systems. However, the provision of power is relatively difficult to achieve in practice, since energy is normally a scarce resource in the above-discussed and other field devices.

In particular, limited available power is a problem in systems using a two wire current loop for communication and power supply. Radar level gauges for measuring a level in a tank, and other types of field devices, may often be communicate with a remote location, such as a control room, by means of a two-wire interface, where only two lines serve to both supply the sensor with limited power and to communicate a measurement signal indicative of a process variable determined by the field device. The interface can be a 4-20 mA industrial loop with or without superimposed digital communication, or another two-wire fieldbus, such as Fieldbus Foundation (FF) or Profibus.

A loop-powered field device therefore needs to be capable of both providing a measurement signal to the two-wire current bus, and of drawing power from the two-wire current bus for operation of the field device.

According to one known configuration, a controllable current source and a regulated converter are connected in series along the two-wire control loop. In such a configuration, the measurement signal is provided to the two-wire current bus using the controllable current source, which may be controllable to control the DC current on the two-wire current loop and/or modulate the current to provide digital data, and the regulated converter converts a regulated input voltage to an output voltage used to power the field device.

For various field devices, especially various recent radar level gauges, the configuration described above is not capable of providing sufficient power to the field device under all operating situations/conditions.

SUMMARY OF THE INVENTION

It is an object of the present invention to address the above problems, and to provide more efficient power supply to a loop-powered field device.

According to a first aspect of the present invention, it is therefore provided a loop-powered field device for determining a process variable and providing a measurement signal indicative of the process variable to a remote location via a two-wire current loop, the loop-powered field device comprising: a measurement device for determining the process variable; and loop interface circuitry for providing the signal to the two-wire current loop and for providing power from the two-wire current loop to the measurement device, wherein the loop interface circuitry comprises: current control circuitry connected to the two-wire current loop and the measurement device, the current control circuitry being controllable by the measurement device to provide the measurement signal to the two-wire current loop; a first converter having inputs connected to the two-wire current loop in series with the current control circuitry, and an output for providing power to the measurement device; and voltage regulation circuitry for regulating a voltage across the current control circuitry towards a desired voltage, by controlling an input voltage across the inputs of the first converter. To this end, the voltage regulation circuitry may be connected to the first converter and configured to regulate the input voltage across the input terminals of the first converter such that a voltage across the current control circuitry is regulated towards the desired voltage.

The first converter converts an input power from the two-wire current loop to an output power for powering the measurement device. To that end, the first converter may be configured to convert an input voltage across the input terminals to an output voltage across the output terminals.

The voltage regulation circuitry is arranged to sense a property that is indicative of the voltage across the current control circuitry. In this sense, the voltage regulation circuitry may be said to be connected to the current control circuitry.

In particular, the voltage regulation circuitry may be configured to regulate the input voltage across the inputs of the first converter to regulate the voltage across the current control circuitry towards the desired voltage when the loop voltage varies. The loop voltage is typically determined by a remote master or host, and may vary depending on the particular configuration, such as on the number of field devices that are connected to the two-wire current loop, how long the loop wires are, etc, and/or on the power consumption of the field device(s) that is(are) connected to the two-wire current loop.

By a "field device" should be understood any device that determines a process variable and communicates a measurement signal indicative of that process variable to a remote location. Examples of field devices include devices for determining process variables such as filling level, temperature, pressure, fluid flow etc.

The present invention is based on the realization that simple and efficient provision of power from a two-wire current loop to a field device can be achieved by allowing the voltage across the input terminals of the converter to vary in response to variations in the loop voltage, while ensuring that a sufficient voltage is always present across the current control circuitry for providing a measurement signal from the field device to a remote location.

Hereby, a large portion of the total available power on the two-wire current loop can be used for powering the field device regardless of the loop voltage. This is in contrast to the configuration described in the Background Section where a regulated converter is provided in series with current control circuitry, and the regulated converter converts a regulated input voltage to an output voltage used to power the field device.

In this prior art configuration, the input voltage of the regulated converter is kept constant, which means that the regulated input voltage has to be dimensioned based on the minimum loop voltage to ensure that a measurement signal from the field device can be provided to the two-wire current loop. As a consequence, additional power that is available on the two-wire current loop when the loop voltage is higher than the minimum loop voltage cannot be used for powering the field device.

The desired voltage may be a voltage that is higher than a minimum voltage required to enable the current control circuitry to provide the measurement signal. This minimum voltage will depend on various factors, such as the type of current control circuitry and the measurement signal. For example, a lower minimum voltage may be required for providing a DC-signal than for providing an AC-signal.

Moreover, the desired voltage may be a predetermined voltage that is known to be sufficiently high for all relevant operation conditions for a particular field device, or may be a dynamically determined desired voltage. In the latter case, the desired voltage may, for example, be a function of the loop current flowing through the two-wire current loop.

The first converter may advantageously be a so-called switching converter. In a switching converter, power is converted to the output at a desired output voltage level.

Furthermore, the current control circuitry may be controllable to regulate a loop current flowing through the two-wire current loop with a first time constant, and the voltage regulation circuitry may be configured to regulate the input voltage across the inputs of the first converter with a second time constant. The second time constant may advantageously be substantially greater than the first time constant, such as at least 10 times greater. Advantageously, the ratio between the second time constant and the first constant may be even greater, such as at least 50 or more. Accordingly, the regulation of the current control circuitry may be substantially faster than the regulation of the input voltage across the input terminals of the converter. Hereby, the voltage across the current control circuitry is allowed to vary momentarily so that the loop current can be controlled quickly and accurately to provide the measurement signal to the remote location via the two-wire control loop. This is particularly advantageous for field devices for digital communication over the two-wire current loop. Examples of standards for such digital communication include HART, Foundation Fieldbus and Profibus, etc.

According to various embodiments, the loop-powered field device may further comprise an energy storage device connected to the first converter. Through the provision of such an energy storage device, a temporary surplus of energy can be stored and used later when the power required for operation of the field device is higher than what can be drawn from the two-wire current loop. The energy storage device may, for example, comprise a capacitor, a super-capacitor and/or a battery or any other device capable of storing electrical energy.

Moreover, the loop-powered field device may comprise a second converter having input terminals connected to the output terminals of the first converter. Through the provision of such a second converter, any variations in the output voltage of the first converter can be handled, so that a regulated voltage can be provided to the measurement device if/when this is desirable. This may be particularly useful for embodiments of the loop-powered field device comprising an energy storage device for storing energy provided by the first converter.

The loop-powered field device may further comprise a shunt regulator for limiting the output voltage of the first converter. The shunt regulator may be connected between output terminals of the voltage regulator to limit the voltage provided to the measurement device.

The loop-powered field device may advantageously be a radar level gauge comprising: a microwave unit for generating microwaves and propagating the microwaves towards a product contained in a tank; and processing circuitry for determining a filling level of the product contained in the tank and for controlling the current control circuitry comprised in the loop interface circuitry to provide the measurement signal indicative of the filling level to the two-wire current loop.

According to one embodiment, the microwave unit may be adapted to emit pulsed signals, and the processing circuitry may be adapted to determine a filling level of the container based on the time between the emission of a pulsed signal and the reception of the reflected signal. This type of measuring is referred to as pulsed measuring.

According to a second embodiment, the microwave unit may be adapted to emit waves over a range of frequencies, and the processing circuitry may be adapted to determine a filling level of the container based on a mix of the emitted signal and the reflected signal. This type of measuring is referred to as FMCW (Frequency Modulated Continuous Wave). The microwave unit may also be adapted to emit pulsed waves with a number of different frequencies, referred to as MFPW (Multiple Frequency Pulsed Wave).

According to a second aspect of the present invention, there is provided a loop interface circuit for providing, to a remote location via a two-wire current loop, a measurement signal indicative of a process variable determined by a measurement device, the loop interface circuit comprising: current control circuitry for providing the measurement signal to the two-wire current loop; a first converter having inputs, arranged in series with the current control circuitry, for receiving power from the two-wire current loop, and an output for providing power to the measurement device; and voltage regulation circuitry for regulating a voltage across said current control circuitry towards a desired voltage, by controlling an input voltage across the inputs of the first converter.

The first converter converts an input power from the two-wire current loop to an output power for powering the measurement device. To that end, the first converter may be configured to convert an input voltage across the input terminals to an output voltage across the output terminals.

The voltage regulation circuitry is arranged to sense a property that is indicative of the voltage across the current control circuitry. In this sense, the voltage regulation circuitry may be said to be connected to the current control circuitry.

Embodiments of, and effects obtained through this second aspect of the present invention are largely analogous to those described above for the first aspect of the invention.

According to a third aspect of the present invention, there is provided a method of providing power from a two-wire current loop to a loop-powered field device using loop interface circuitry comprising: current control circuitry for providing a measurement signal from the loop-powered field device to a remote location via the two-wire control loop; and a first converter having inputs connected in series with the current control circuitry, and an output for providing power to the loop-powered field device, the method comprising the steps of: controlling the current control circuitry to regulate a loop current flowing through the two-wire current loop, thereby providing the measurement signal; and regulating a voltage across the current control circuitry towards a desired voltage, by controlling an input voltage across the inputs of the first converter.

The current control circuitry may advantageously be controlled to regulate the loop current with a first time constant, and the input voltage across the input terminals of the first converter may be regulated with a second time constant being substantially greater than the first time constant.

Embodiments of, and effects obtained through this third aspect of the present invention are largely analogous to those described above for the first and second aspects of the invention.

BRIEF DESCRIPTION OF THE DRAWINGS

These and other aspects of the present invention will now be described in more detail, with reference to the appended drawings showing a currently preferred embodiment of the invention, wherein.

DETAILED DESCRIPTION OF PREFERRED EMBODIMENTS

In the present detailed description, an exemplary embodiment of the loop-powered field device according to the present invention is discussed with reference to a non-contact radar level gauge system. It should be noted that this by no means limits the scope of the present invention, which is equally applicable to other loop-powered field devices, such as guided wave radar systems, temperature sensors, pressure sensors, etc. Moreover, the two-wire current loop may configured to function according to various communication standards, such as 4-20 mA, HART, Foundation Fieldbus, Profibus etc.

Figure 1:
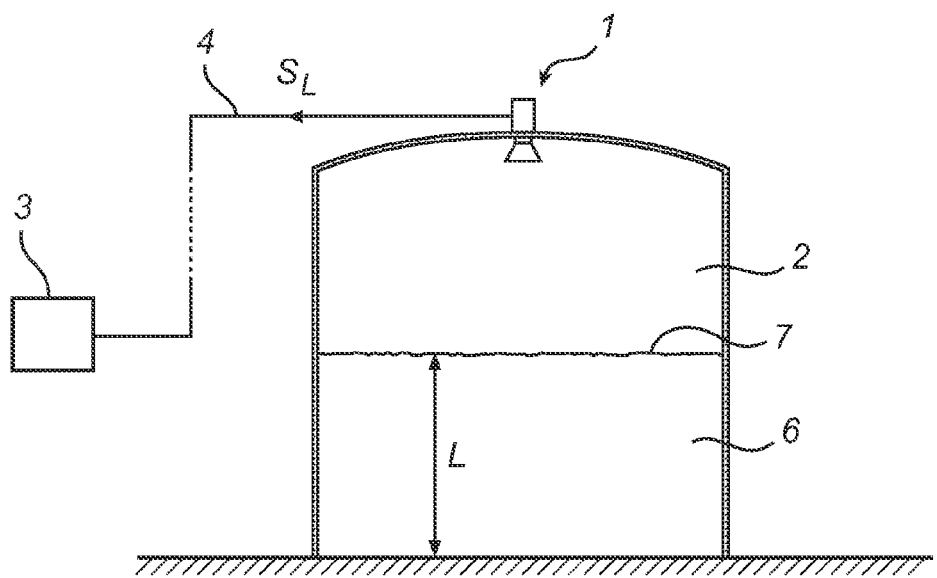
FIG. 1 schematically illustrates a loop-powered field device, in the form of a radar level gauge installed in an exemplary tank.

FIG. 1 schematically illustrates a loop-powered field device in the form of a radar level gauge 1 installed in an exemplary tank 2. The radar level gauge 1 is connected to a remote host/master 3 via a two-wire current loop 4, which is also used to provide power to the radar level gauge 1. The tank 2 contains a product 6, and when in operation, the radar level gauge 1 determines the filling level L of the product 6 in the tank 2 by determining the time-of-flight of a microwave signal that is radiated towards the surface 7 of the product, where it is reflected back towards the radar level gauge 1. From the time-of-flight and the propagation velocity of the microwave signal, the distance to the surface 7 of the product 6 can be determined. This distance can be converted to the filling level L using knowledge of the dimensions of the tank 2.

After having determined the filling level L, which is an example of a process variable, the radar level gauge provides a measurement signal $S_L$ indicative of the filling level L to the remote host/master 3 via the two-wire current loop 4. The provision of the measurement signal $S_L$ to the two-wire current loop 4, as well as the provision of power from the two-wire current loop 4 to the loop-powered field device 1 will be described in more detail below with reference to FIG. 2.

Figure 2:
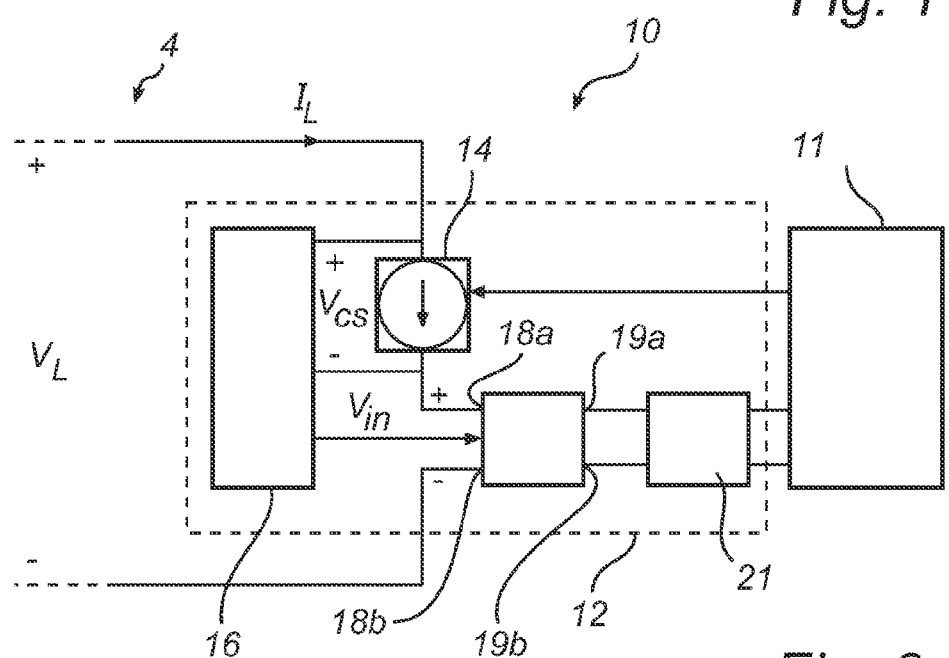
FIG. 2 is a block diagram schematically illustrating an exemplary embodiment of the loop-powered field device according to the present invention

FIG. 2 is a block diagram schematically illustrating an exemplary embodiment of the loop-powered field device according to the present invention, such as the radar level gauge 1 in FIG. 1.

The loop-powered field device 10 in FIG. 2 comprises a measurement device 11 for determining a process variable, such as the above-mentioned filling level L, and loop interface circuitry 12 for providing a measurement signal $S_L$ indicative of the process variable to the two-wire current loop 4, and for providing power from the two-wire current loop 4 to the measurement device 11.

The loop interface circuitry 12 comprises current control circuitry in the form of a controllable current source 14, a first converter 15 and voltage regulation circuitry 16.

During operation of the loop-powered field device 11, the controllable current source 14 is controlled by the measurement device 11 to provide the measurement signal $S_L$ to the two-wire current loop 4. The measurement signal $S_L$ may be in the form of a the loop current $I_L$ (a DC current level) and/or a an AC signal superimposed on the loop current $I_L$. An example of the latter case could be communication on a 4-20 mA current loop according to the HART-protocol.

In the exemplary case that is schematically illustrated in FIG. 2, it is assumed that the measurement signal $S_L$ is provided in the form of a certain loop current $I_L$ between 4 mA and 20 mA, as is indicated in FIG. 2.

The first converter 15 has input terminals 18a-b and output terminals 19a-b, where the input terminals 18a-b are connected to the two-wire current loop 4 in series with the controllable current source 14, and the output terminals are connected to the measurement device 11 to provide power from the two-wire current loop 4 to the measurement device 11.

The voltage regulation circuitry 16 monitors the voltage $V_{cs}$ across the current source 14 and controls the input voltage $V_{in}$ of the first converter to keep the voltage $V_{cs}$ across the current source 14 substantially constant at a predetermined value, such as 2V, when the loop voltage $V_L$ varies. This may be realized in various ways by one of ordinary skill in the art. For example, the first converter 15 may be a switching converter of the so-called "buck/boost" type. Such a converter may, for example, be realized in the form of a so-called SEPIC converter, which is well known to electrical engineers. The input voltage of a SEPIC converter can be controlled by controlling a switching transistor in the converter, for example using pulse width modulation.

However, practically any switching converter may be used in the field device according to various embodiments of the present invention. For example, a forward converter or a flyback converter may be used.

On the output side of the converter 15, additional circuitry 21 may be provided, which may have different configurations depending on the desired function. Some examples of such additional circuitry 21 will be described further below with reference to the schematic block diagrams of FIGS. 3a-c.

When a new measurement signal $S_L$ should be provided to the two-wire current loop 4, the controllable current source 14 is controlled by the measurement device 11 to provide a new loop current $I_L$ to the two-wire current loop. In order to modify the loop current $I_L$, the voltage $V_{cs}$ across the controllable current source should temporarily be allowed to be changed. However, the voltage regulation circuitry strives to keep the voltage $V_{cs}$ across the controllable current source 14 constant. To allow for rapid and accurate changes in the measurement signal, while at the same time keeping the voltage $V_{cs}$ across the controllable current source substantially constant over time, the control of the controllable current source 14 may preferably be faster (have a shorter time constant) than the control of the voltage $V_{in}$ across the input terminals 18a-b of the first converter 15.

Figures 3A, 3B, 3C:
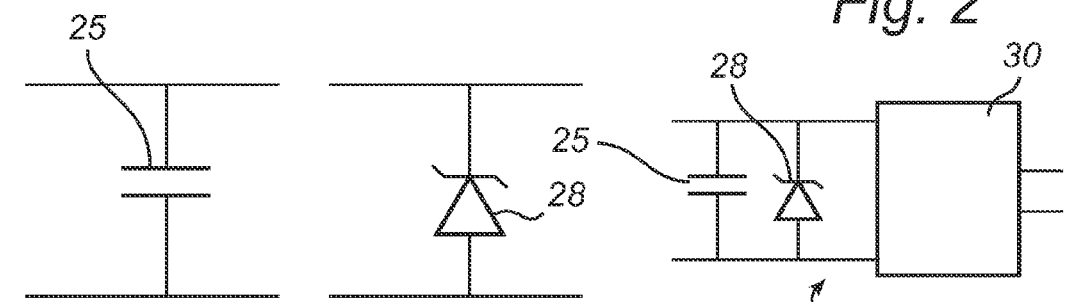
FIGS. 3a-c are block diagrams schematically illustrating different configurations of the loop-powered field device in FIG. 2.

According to a first exemplary configuration, schematically illustrated in FIG. 3a, the additional circuitry 21 may comprise an energy storage device, such as the capacitor 25 shown in FIG. 3a. It should be noted that the capacitor 25 is only a simple example of an energy storage device, and that the additional circuitry may comprise further components, such as one or several resistors etc.

When, referring also to FIG. 2, the measurement device 11 demands more power than can currently be provided by the first converter 15 the capacitor 25 will be discharged, thereby providing additional power needed. This will be especially important when the available current in the current loop is low.

According to a second exemplary configuration, schematically illustrated in FIG. 3b, the additional circuitry 21 may comprise a shunt regulator, such as the zener diode 28 shown in FIG. 3b. Through the provision of such a shunt regulator, the input voltage to the measurement device 11 (in FIG. 2) can be limited to be below a certain maximum voltage.

Finally, according to a third exemplary configuration, schematically illustrated in FIG. 3c, the additional circuitry 21 may comprise an energy storage device 25, a shunt regulator 28 and a second converter 30. With the configuration in FIG. 3c, energy can be stored, and at the same time a regulated voltage, with low ripple, can be provided to the measurement device 11 (FIG. 2). Alternatively, the second converter 30 may be comprised in the measurement device 11.

Figure 4:
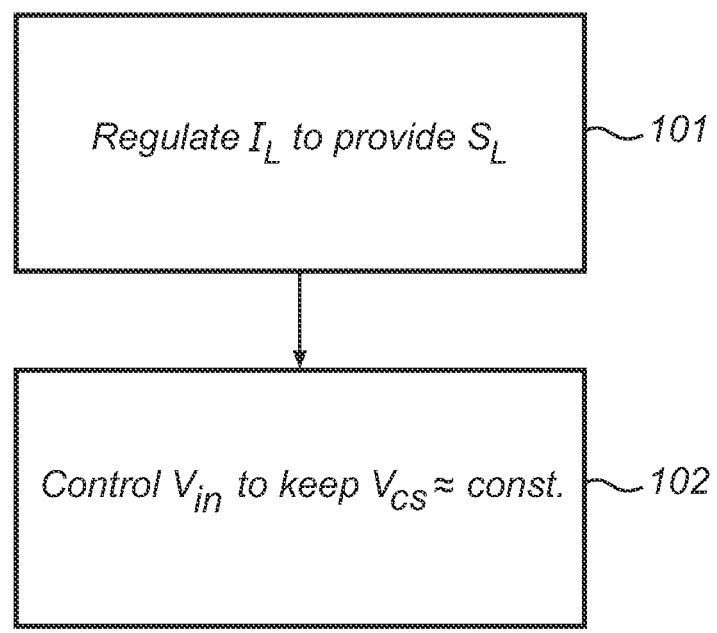
FIG. 4 is a flow-chart schematically illustrating a method of providing power from a two-wire current loop to a loop-powered field device, according to an embodiment of the present invention.

Having now described an exemplary embodiment of the loop-powered field device 11 according to the present invention, an embodiment of the method according to the present invention will finally be described with reference to the flow-chart in FIG. 4 as well as to the block diagram in FIG. 2.

In a first step 101, the controllable current source 14 is controlled by the measurement device 11 to regulate the loop current $I_L$ to thereby provide the measurement signal $S_L$ to a remote master/host.

In a second step 102, which may take place simultaneously with the first step 101, but suitably with another (longer) time constant, the input voltage $V_{in}$ across the input terminals 18a-b of the converter 15 is controlled to keep the voltage $V_{cs}$ across the controllable current source 14 substantially constant for varying loop voltages $V_L$.

The person skilled in the art realizes that the present invention by no means is limited to the preferred embodiments described above. On the contrary, many modifications and variations are possible within the scope of the appended claims.

In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

What is claimed is:

1. A loop-powered field device for determining a process variable and providing a measurement signal indicative of said process variable to a remote location via a two-wire current loop, said loop-powered field device comprising:
   a measurement device for determining said process variable; and
   loop interface circuitry for providing said measurement signal to the two-wire current loop and for providing power from said two-wire current loop to said measurement device,
   wherein said loop interface circuitry comprises:
   current control circuitry connected to the two-wire current loop and the measurement device, said current control circuitry being controllable by said measurement device to provide said measurement signal to the two-wire current loop;
   a first converter having inputs connected to said two-wire current loop in series with said current control circuitry, and an output for providing power to said measurement device; and
   voltage regulation circuitry for regulating a voltage across said current control circuitry towards a desired voltage, by controlling an input voltage across the inputs of the first converter.

2. The loop-powered field device according to claim 1, wherein said desired voltage is higher than a minimum voltage required to enable said current control circuitry to provide said measurement signal.

3. The loop-powered field device according to claim 1, wherein said desired voltage is a predetermined voltage.

4. The loop-powered field device according to claim 1, wherein said first converter is a switching converter.

5. The loop-powered field device according to claim 1, wherein said current control circuitry is controllable to regulate a loop current flowing through said two-wire current loop with a first time constant, and said voltage regulation circuitry is configured to regulate said input voltage across the inputs of the first converter with a second time constant being substantially greater than said first time constant.

6. The loop-powered field device according to claim 5, wherein said second time constant is at least 10 times greater than said first time constant.

7. The loop-powered field device according to claim 1, further comprising an energy storage device connected to said first converter.

8. The loop-powered field device according to claim 1, comprising a second converter having input terminals connected to said output terminals of said first converter.

9. The loop-powered field device according to claim 1, further comprising a shunt regulator for limiting the output voltage of the first converter.

10. The loop-powered field device according to claim 1, wherein said field device is a radar level gauge comprising:
    a microwave unit for generating microwaves and propagating said microwaves towards a product contained in a tank; and
    processing circuitry for determining a filling level of said product contained in the tank and for controlling said current control circuitry comprised in said loop interface circuitry to provide said measurement signal indicative of the filling level to the two-wire current loop.

11. A loop interface circuit for providing, to a remote location via a two-wire current loop, a measurement signal indicative of a process variable determined by a measurement device, said loop interface circuit comprising:
    current control circuitry for providing said measurement signal to the two-wire current loop;
    a first converter having inputs, arranged in series with said current control circuitry, for receiving power from said two-wire current loop, and output terminals for providing power to said measurement device; and voltage regulation circuitry for regulating a voltage across said current control circuitry towards a desired voltage, by controlling an input voltage across the inputs of the first converter.

12. A method of providing power from a two-wire current loop to a loop-powered field device using loop interface circuitry comprising:

current control circuitry for providing a measurement signal from said loop-powered field device to a remote location via said two-wire control loop; and a first converter having input terminals connected in series with said current control circuitry, and output terminals for providing power to said loop-powered field device, said method comprising the steps of:

controlling said current control circuitry to regulate a loop current flowing through said two-wire current loop, thereby providing said measurement signal; and regulating a voltage across said current control circuitry towards a desired voltage, by controlling an input voltage across the inputs of the first converter.

13. The method according to claim 12, wherein said desired voltage is higher than a minimum voltage required to enable said current control circuitry to provide said measurement signal.

14. The method according to claim 12, wherein said current control circuitry is controlled to regulate said loop current with a first time constant, and said input voltage across the inputs of the first converter is regulated with a second time constant being substantially greater than said first time constant.

15. The method according to claim 14, wherein said second time constant is at least 10 times greater than said first time constant.

* * * * *